(12) United States Patent
Field

(10) Patent No.: US 10,641,876 B2
(45) Date of Patent: May 5, 2020

(54) APPARATUS AND METHOD FOR MITIGATING LIDAR INTERFERENCE THROUGH PULSE CODING AND FREQUENCY SHIFTING

(71) Applicant: Quanergy Systems, Inc., Sunnyvale, CA (US)

(72) Inventor: Ryan Field, Palo Alto, CA (US)

(73) Assignee: Quanergy Systems, Inc., Sunnyvale, CA (US)

( * ) Notice: Subject to any disclaimer, the term of this patent is extended or adjusted under 35 U.S.C. 154(b) by 341 days.

(21) Appl. No.: 15/481,375

(22) Filed: Apr. 6, 2017

(65) Prior Publication Data

US 2018/0292534 A1    Oct. 11, 2018

(51) Int. Cl.
*G01S 7/487* (2006.01)
*G01S 17/10* (2020.01)

(52) U.S. Cl.
CPC .............. *G01S 7/487* (2013.01); *G01S 17/10* (2013.01)

(58) Field of Classification Search
CPC .......... G01S 17/10; G01S 17/87; G01S 17/89; G01S 7/4863; G01S 7/4816; G01S 7/484; G01S 7/486; G01S 17/936
See application file for complete search history.

(56) References Cited

U.S. PATENT DOCUMENTS

| | | |
|---|---|---|
| 3,781,552 A | 12/1973 | Kadrmas |
| 5,132,843 A | 7/1992 | Aoyama et al. |
| 5,210,586 A | 5/1993 | Grage |
| 5,276,637 A | 1/1994 | Mossberg |
| 5,455,669 A | 10/1995 | Wetteborn |
| 5,543,805 A | 8/1996 | Thaniyavarn |
| 5,552,893 A | 9/1996 | Akasu |
| 5,682,229 A | 10/1997 | Wangler |
| 5,898,483 A | 4/1999 | Flowers |
| 6,891,987 B2 | 5/2005 | Ionov et al. |
| 7,746,449 B2 | 6/2010 | Ray et al. |
| 7,969,558 B2 | 6/2011 | Hall |

(Continued)

FOREIGN PATENT DOCUMENTS

EP    1 731 892 A1    12/2006

OTHER PUBLICATIONS

International Search Report and Written Opinion issued to International Patent Application No. PCT/US18/26579, dated Jul. 3, 2018, 9 pgs.

(Continued)

*Primary Examiner* — Luke D Ratcliffe
(74) *Attorney, Agent, or Firm* — Cooley LLP

(57) ABSTRACT

An apparatus has a first emitter emitting at a first frequency optical pulses that form a first pulse collection. A second emitter emits at a second frequency optical pulses that form a second pulse collection. A first receiver collects during a time of flight time window a first reflected pulse collection corresponding to the first pulse collection reflected from a sensed object. A second receiver collects during the time of flight time window a second reflected pulse collection corresponding to the second pulse collection reflected from the sensed object. A processor analyzes the first reflected pulse collection and the second reflected pulse collection to produce first reflected pulse collection metrics and second reflected pulse collection metrics.

11 Claims, 3 Drawing Sheets

(56) References Cited

U.S. PATENT DOCUMENTS

| | | |
|---|---|---|
| 8,125,367 B2 | 2/2012 | Ludwig |
| 8,203,115 B2 | 6/2012 | Hochberg et al. |
| 8,311,374 B2 | 11/2012 | Hochberg et al. |
| 8,731,247 B2 | 5/2014 | Pollock |
| 8,836,922 B1 | 9/2014 | Pennecot et al. |
| 8,988,754 B2 | 3/2015 | Sun et al. |
| 9,014,903 B1 | 4/2015 | Zhu |
| 9,069,080 B2 | 6/2015 | Stettner et al. |
| 9,104,086 B1 | 8/2015 | Davids et al. |
| 9,383,753 B1 | 7/2016 | Templeton et al. |
| 9,482,519 B2 | 11/2016 | Zhang |
| 9,575,184 B2 | 2/2017 | Gilliland et al. |
| 2005/0033497 A1 | 2/2005 | Stopczynski |
| 2006/0091303 A1 | 5/2006 | Evans |
| 2006/0197936 A1 | 9/2006 | Liebman et al. |
| 2006/0222109 A1* | 10/2006 | Watanabe .............. H04L 27/06 375/324 |
| 2006/0227315 A1* | 10/2006 | Beller .................. G01S 7/4818 356/3 |
| 2006/0239688 A1 | 10/2006 | Hillis et al. |
| 2007/0052947 A1 | 3/2007 | Ludwig et al. |
| 2007/0181810 A1 | 8/2007 | Tan et al. |
| 2008/0094607 A1 | 4/2008 | Bernard et al. |
| 2008/0186470 A1 | 8/2008 | Hipp |
| 2008/0204699 A1 | 8/2008 | Benz et al. |
| 2008/0227292 A1 | 9/2008 | Miki |
| 2009/0059201 A1 | 3/2009 | Willner et al. |
| 2009/0153872 A1 | 6/2009 | Sebastian et al. |
| 2009/0251680 A1 | 10/2009 | Farsaie |
| 2009/0278030 A1 | 11/2009 | Deliwala |
| 2010/0045964 A1 | 2/2010 | Jin et al. |
| 2010/0187402 A1 | 7/2010 | Hochberg et al. |
| 2010/0187442 A1 | 7/2010 | Hochberg et al. |
| 2010/0253585 A1 | 10/2010 | Llorens del Rio et al. |
| 2010/0271614 A1 | 10/2010 | Albuquerque et al. |
| 2010/0290029 A1 | 11/2010 | Hata |
| 2011/0161014 A1 | 6/2011 | Kim et al. |
| 2011/0216304 A1 | 9/2011 | Hall |
| 2011/0222814 A1 | 9/2011 | Krill et al. |
| 2011/0255070 A1 | 10/2011 | Phillips et al. |
| 2011/0292371 A1* | 12/2011 | Chang .................. G01S 7/4818 356/5.01 |
| 2011/0316978 A1 | 12/2011 | Dillon et al. |
| 2012/0013962 A1 | 1/2012 | Subbaraman et al. |
| 2012/0226118 A1 | 9/2012 | Delbeke et al. |
| 2012/0286136 A1 | 11/2012 | Krill et al. |
| 2013/0027715 A1 | 1/2013 | Imaki et al. |
| 2013/0044309 A1 | 2/2013 | Dakin et al. |
| 2013/0114924 A1 | 5/2013 | Loh et al. |
| 2013/0127980 A1 | 5/2013 | Haddick |
| 2013/0208256 A1 | 8/2013 | Mamidipudi et al. |
| 2013/0242400 A1 | 9/2013 | Chen |
| 2013/0301976 A1 | 11/2013 | Saida et al. |
| 2014/0152871 A1 | 6/2014 | Campbell |
| 2014/0211194 A1 | 7/2014 | Pacala |
| 2014/0240691 A1 | 8/2014 | Mheen |
| 2014/0376001 A1 | 12/2014 | Swanson |
| 2015/0192677 A1 | 7/2015 | Yu |
| 2015/0293224 A1 | 10/2015 | Eldada |
| 2015/0346340 A1 | 12/2015 | Yaacobi et al. |
| 2015/0378241 A1 | 12/2015 | Eldada |
| 2016/0003946 A1* | 1/2016 | Gilliland .................. G01S 17/10 356/5.01 |
| 2016/0033644 A1 | 2/2016 | Moore |
| 2016/0047901 A1 | 2/2016 | Pacala |
| 2016/0049765 A1 | 2/2016 | Eldada |
| 2016/0161600 A1 | 6/2016 | Eldada |
| 2019/0056497 A1* | 2/2019 | Pacala ............... H01L 27/14643 |

OTHER PUBLICATIONS

Guo et al., "InP Photonic Integrated Circuit for 2D Optical Beam Steering", Photonics Conference, Oct. 9-13, 2011, Arlington, VA, IEEE, 2011, 3 pgs.

Guo et al., "Two-Dimensional optical Beam Steering with InP-Based Photonic Integrated Circuits", IEEE Journal of Selected Topics in Quantum Electronics, vol. 19, No. 4, Aug. 2013, pp. 1, 6, 8, 11.

Hulme et al., "Fully Integrated Hybrid Silicon Free-Space Beam Steering Source with 32 Channel Phased Array", SPIE, Mar. 26, 2014, pp. 898907-2, 898907-13.

Taillaert et al., "An Out-Of-Plane Grating Coupler for Efficient Butt-Coupling Between Compact Planar Waveguides and Single-Mode Fibers", IEEE Journal of Quantum Electronics, vol. 38, No. 7, Jul. 2002, pp. 951-953.

International Search Report and Written Opinion issued to International Patent Application No. PCT/US15/44069, dated Nov. 12, 2015, 9 pgs.

Van Acoleyen, Karel, "Nanophotonic Beamsteering Elements Using Silicon Technology for Wireless Optical Applications", Ghent University, Dept. of Information Technology, Aug. 27, 2012, 180 pgs.

Van Acoleyen, Karel, "Off-Chip Beam Steering with a One-Dimensional Optical Phased Array on Silicon-On-Insulator", Optics Letters, vol. 34, No. 9, May 1, 2009, pp. 1477-1479.

International Search Report and Written Opinion issued to international patent application No. PCT/US15/56516, dated Feb. 4, 2016, 7 pgs.

* cited by examiner

APPARATUS AND METHOD FOR MITIGATING LIDAR INTERFERENCE THROUGH PULSE CODING AND FREQUENCY SHIFTING

FIELD OF THE INVENTION

This invention relates generally to optical signal processing. More particularly, this invention relates to mitigating lidar interference through pulse coding and frequency shifting.

BACKGROUND OF THE INVENTION

A lidar sensor is a light detection and ranging sensor. A lidar optical remote sensing module can measure the distance to a target (e.g., a landscape in front of the module) by irradiating the target with light pulses from a laser. Time of flight is the time that it takes photons to travel to the target and return after reflection. A receiver in the lidar module processes the reflected photons.

Lidar sensors are increasingly being incorporated into motor vehicles to provide autonomous or semi-autonomous driving abilities. When multiple laser sources are used in a lidar system or when multiple lidar sensors are used simultaneously there exist possibilities for interference between the optical signals used by the sensors. The sensors can be part of the same vehicle system or on different vehicles.

This prior art problem is illustrated in FIG. 1, which depicts a primary signal 100 and an interfering signal 102. A lidar sensor and associated electronics may be used to construct a detected signal histogram 104. The detected signal histogram 104 includes attributes 106, 108 and 110 of the primary signal 100. However, the detected signal histogram 104 also includes interfering signal attributes 112, 114 and 116.

Accordingly, there is a need to mitigate lidar interference between multiple lidar sources.

SUMMARY OF THE INVENTION

An apparatus has a first emitter emitting at a first frequency optical pulses that form a first pulse collection. A second emitter emits at a second frequency optical pulses that form a second pulse collection. A first receiver collects during a time of flight time window a first reflected pulse collection corresponding to the first pulse collection reflected from a sensed object. A second receiver collects during the time of flight time window a second reflected pulse collection corresponding to the second pulse collection reflected from the sensed object. A processor analyzes the first reflected pulse collection and the second reflected pulse collection to produce first reflected pulse collection metrics and second reflected pulse collection metrics.

In another embodiment, an apparatus has an emitter emitting at a first frequency optical pulses that form a pulse collection. A receiver collects during a time of flight time window a reflected pulse collection corresponding to the pulse collection reflected from a sensed object. The receiver is frequency locked to the emitter operating at the first frequency. A processor analyzes the reflected pulse collection to produce reflected pulse collection metrics.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 2:
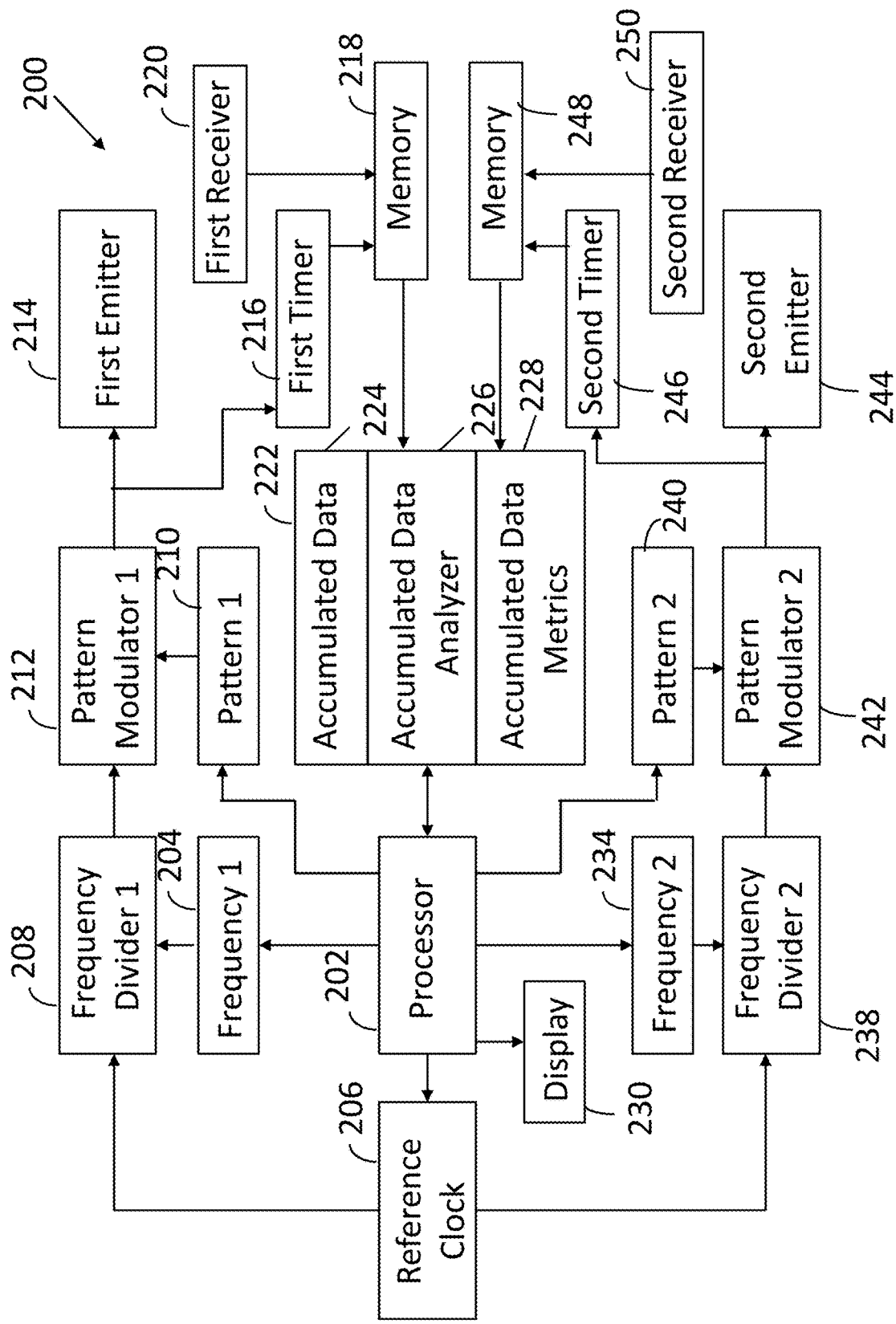
FIG. 2 illustrates a system configured in accordance with an embodiment of the invention.

FIG. 2 illustrates an apparatus 200 for mitigating lidar interference through pulse coding and frequency shifting. The apparatus 200 includes a processor 202, which specifies a first frequency that may be written to a register 204. The processor 202 controls a reference clock 206, which feeds a first frequency divider 208 to generate the first frequency specified in register 204. Alternately, the reference clock 206 may be independent of the processor 202, such as a crystal oscillator or another integrated circuit. For a single system, the reference clock should be common between all emitters.

The processor 202 writes a first pattern to a register 210. The output of the frequency divider 208 is applied to first pattern modulator 212. The pattern modulator 212 implements the pattern stored in register 210. A pattern is one or more pulses. A pattern is selected to increase the signal-to-noise ratio of sensed feedback signals. In one embodiment, each pattern is a finite sequence of digital values with an ideal autocorrelation property, such that the off-peak (non-cyclic) autocorrelation coefficients are less than one. For example, each pattern may be a Barker code. Alternately, each pattern may be a finite sequence of digital values with complementary sequences that cancel side lobes when summed.

The output of the first pattern modulator 212 is applied to a first emitter 214. The first emitter 214 emits at the first frequency a first plurality of optical codes that form a first pulse code collection. The first plurality of optical codes in the first pulse code collection may include 10s to 1000s of identical optical codes defined by the first pattern.

The first emitter 214 may be any pulsed transmitting device, including, for example, a laser diode (LD), a light-emitting diode (LED), or a photonic integrated circuit (PIC) that has associated laser for optical power. In one embodiment, integrated optic design and fabrication technologies are used for the production of chip-scale optical splitters that distribute an optical signal from a laser to one or more emitter PICs. The emitter PICs include tunable optical delay lines and optical antennas to achieve out-of-plane coupling of light. As the delay lines of the emitter PICs are tuned, each of the emitter PICs emit light of a specific phase to form a desired far-field radiation pattern through interference of emissions.

The techniques of the invention apply to any pulsed emitters. One embodiment is a sensor with multiple PICs independently scanning a scene. Another embodiment has multiple sensors, each with a single pulsed emitter. The techniques of the invention may be used in a variety of sensors utilizing different configurations of emitters and detectors. Exemplary sensors include one emitter and one detector, two or more emitters and one detector, one emitter and two or more detectors and two or more emitters and two or more detectors.

Delivery of the pattern starts a first timer 216. A first receiver 220 collects a first reflected pulse code collection corresponding to the first pulse code collection reflected from a sensed object or landscape. The first reflected pulse code collection may include 10s to 1000s of identical optical codes that are accumulated to develop an accurate characterization of a sensed object.

The first reflected pulse code collection is stored in memory 218. The first reflected pulse code collection is stored during the time of flight time window associated with the first reflected pulse code collection, as measured by the first timer 216. When the time of flight time window is completed, the contents of memory 218 are written to memory 222 as accumulated data 224.

Similar processing transpires with respect to a second frequency. Processor 202 writes a second frequency 234 to register 234. A second frequency divider 238 processes the signal from the reference clock 206 to produce a signal with the second frequency. Processor 202 writes a second pattern to register 240. A second pattern modulator 242 produces a pattern in accordance with the second pattern stored in register 240. The second pattern has the attributes discussed above in connection with the first pattern. A second emitter PIC emits at the second frequency a second plurality of optical pulse codes that form a second pulse code collection. Initiation of the second pulse code collection triggers the second timer 246, which enables memory 248 to store collected values. More particularly, second receiver 250 collects a second reflected pulse code collection corresponding to the second pulse code collection reflected from a sensed object or landscape. When the time of flight time window for the second reflected pulse code collection is completed, the contents of memory 248 are written to memory 222 as accumulated data 224.

The processor 202 executes instructions to analyze the accumulated data 224. In one embodiment, an accumulated data analyzer 226 includes executable instructions to analyze the first reflected pulse code collection and the second reflected pulse code collection (accumulate data 224) to produce accumulated data metrics 228. The accumulated data metrics 228 may include first reflected pulse code collection metrics and second reflected pulse collection metrics. The first and second reflected pulse code collection metrics may each include a detected signal histogram that plots the reflected pulse code collection as a function of the time of flight time window, such as shown in FIG. 3.

Figure 1:
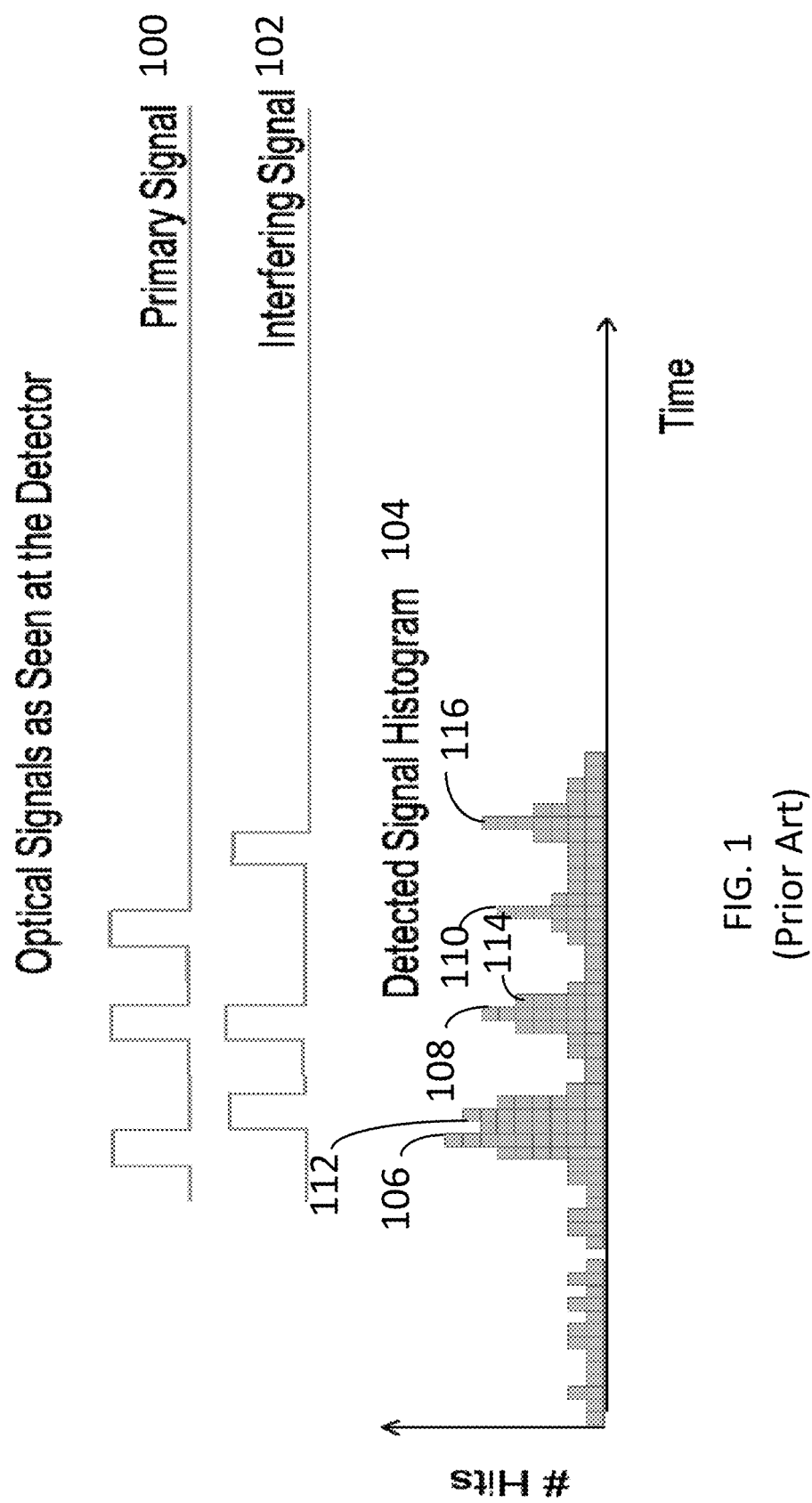
FIG. 1 illustrates the prior art problem of lidar interference between multiple lidar sources.
Figure 3:
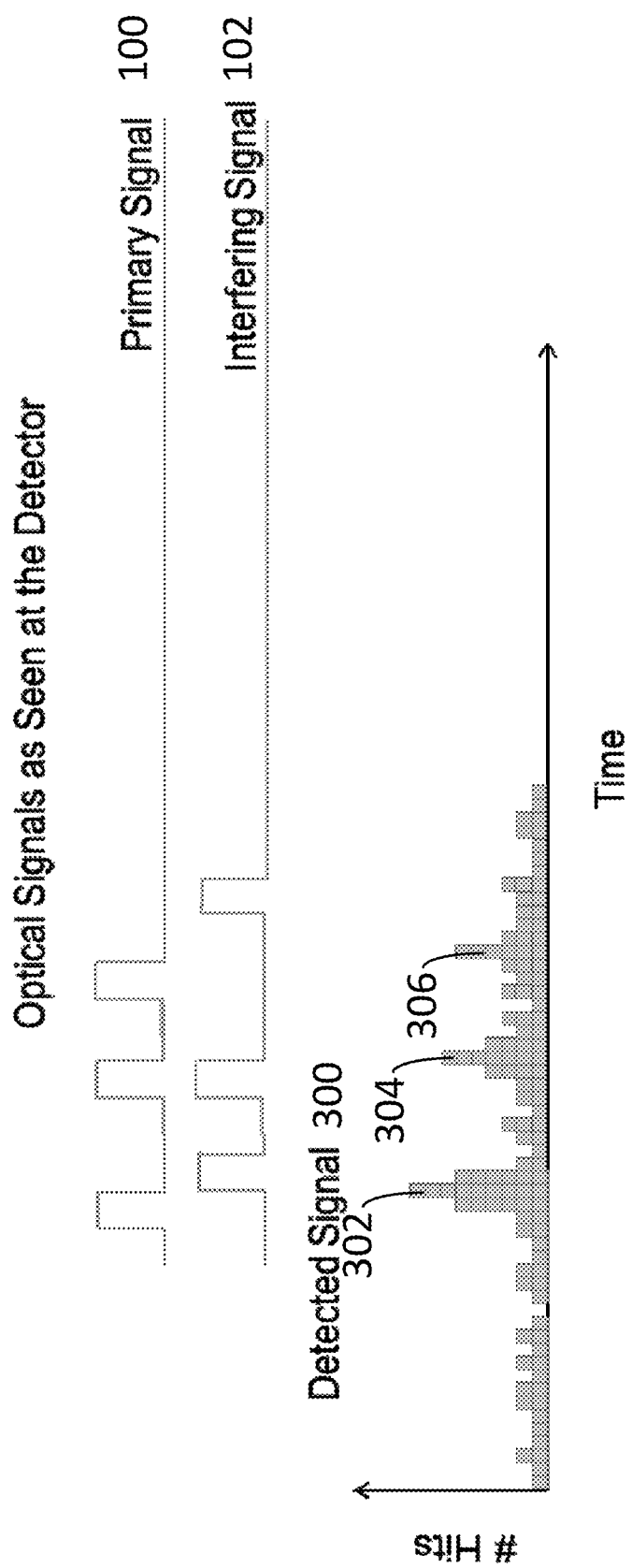
FIG. 3 illustrates a detected signal histogram formed in accordance with an embodiment of the invention.

FIG. 3 illustrates a primary signal 100 and an interfering signal 102. A detected signal histogram 300 more accurately portrays primary signal attributes 302, 304 and 306 compared to the prior art results shown in FIG. 1. These results are achieved through the disclosed pulse coding and frequency shifting. When the primary and interfering signals are at slightly different frequencies, only the primary signal is apparent in the histogram 300. The interfering signal contributes to the noise floor, but does not substantially impact the histogram. For example, if the frequencies are 50 kHz and 50.1 kHz, the difference in timing between each collection would be 40 ns per cycle. As long as the timing difference is larger than the optical pulse width, the interfering signal will not impact the range resolution.

Instead of using the first defined frequency and the second defined frequency, another implementation uses a constrained random variable to set the first frequency without regard for or knowledge of the second frequency. First frequency 204 is randomly selected from a valid range of frequencies. The first frequency divider 208 generates the randomly selected frequency 204 using the reference clock 206. The first pattern modulator 212 sends the pulse pattern to the first emitter 214. The first receiver 220 is frequency locked to the first frequency and detects the primary reflected signal 100. A secondary interfering signal 102 may exist from a source external to the sensor 200. The secondary interfering signal has an unknown frequency. Since the first receiver 220 is locked to the randomized frequency, the primary signal 100 is detected without the presence of the interfering signal 102.

Through the use of constrained random frequencies, both interference from emitters within the same sensor and interference from emitters in different sensors (where explicit control of the frequency is not always possible) will be minimized. In addition, randomizing the frequency setting serves as a means to minimize attempts to intentionally interfere with the device, i.e., spoofing. A fractional-N frequency divider scheme or a pseudo-random number generator may be used to set the fractional difference between frequencies.

The interference prevention mechanism is disclosed in the context of patterns of pulses. Other approaches may be used. For example, a single pulse measurement system or a multi-pulse pattern-based system may be used.

Either the single pulse or the first pulse in the pattern will indicate the start of the measurement period to the time-of-flight (ToF) measurement made by first timer 216 and second timer 246. At the same time, the pulse/pattern triggers the transmitter of the ToF system. When the return signal is received by the receiver, a stop signal is sent to the ToF measurement block. The difference between the start and stop times is the measured ToF.

The accumulated data analyzer 226 may also process the accumulated data 224 in accordance with different statistical metrics. For example, the first reflected pulse code collection metrics may include a first average detected signal for the first reflected pulse code collection and a second average detected signal for the second reflected pulse code collection. Alternately, the first reflected pulse code collection metrics may include a first weighted average detected signal for the first reflected pulse code collection and a second weighted average detected signal for the second reflected pulse code collection. Alternately, the first reflected pulse code collection metrics may include a first detected signal standard deviation for the first reflected pulse code collection and a second detected signal standard deviation for the second reflected pulse code collection.

This invention can be used for any time-of-flight system that leverages a statistical detection mechanism (e.g., Time-Correlated Single-Photon Counting). The value of the invention is highest when applied to systems that either contain many or operate in environments with many similar sensors. Lidar systems are one application of this invention. This invention could also be applied to any other time-of-flight measurement system where multiple measurements are recorded simultaneously.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices.

Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus, comprising:
   a first emitter emitting at a first frequency a first plurality of optical pulses that form a first pulse collection with a first pattern;
   a second emitter emitting at a second frequency different than the first frequency a second plurality of optical pulses that form a second pulse collection with a second pattern different than the first pattern;
   a first receiver to collect during a time of flight time window a first reflected pulse collection corresponding to the first pulse collection reflected from a sensed object;
   a second receiver to collect during the time of flight time window a second reflected pulse collection corresponding to the second pulse collection reflected from the sensed object; and
   a processor to analyze the first reflected pulse collection and the second reflected pulse collection to produce first reflected pulse collection metrics and second reflected pulse collection metrics, wherein the first reflected pulse collection and the second reflected pulse collection are each analyzed to form a detected signal histogram that plots reflected pulse collections as a function of time of flight where an interfering signal contributes to a noise floor, but does not substantially impact the detected signal histogram.

2. The apparatus of claim 1 wherein the first plurality of optical pulses includes a first plurality of optical pulse codes and the second plurality of optical pulses includes a second plurality of optical pulse codes.

3. The apparatus of claim 2 wherein each optical pulse code of the first plurality of optical pulse codes and the second plurality of optical pulse codes has off-peak auto-correlation coefficients that are less than one.

4. The apparatus of claim 2 wherein each optical pulse code of the first plurality of optical pulse codes and the second plurality of optical pulse codes has complementary sequences that cancel side lobes when summed.

5. The apparatus of claim 1 wherein the first reflected pulse collection metrics include a first detected signal histogram that plots the first reflected pulse collection as a function of the time of flight time window and the second reflected pulse collection metrics include a second detected signal histogram that plots the second reflected pulse collection as a function of the time of flight time window.

6. The apparatus of claim 1 wherein the first reflected pulse collection metrics include a first average detected signal for the first reflected pulse collection and a second average detected signal for the second reflected pulse collection.

7. The apparatus of claim 1 wherein the first reflected pulse collection metrics include a first weighted average detected signal for the first reflected pulse collection and a second weighted average detected signal for the second reflected pulse collection.

8. The apparatus of claim 1 wherein the first reflected pulse collection metrics include a first detected signal standard deviation for the first reflected pulse collection and a second detected signal standard deviation for the second reflected pulse collection.

9. The apparatus of claim 1 further comprising a reference clock connected to a first frequency divider to form the first frequency and a second frequency divider to form the second frequency.

10. The apparatus of claim 1 wherein the first plurality of optical pulses are formed from a first pulse pattern modulator responsive to a first stored pulse code and the second plurality of optical pulses are formed from a second pulse code pattern modulator responsive to a second stored pulse code.

11. The apparatus of claim 1 wherein the first receiver is connected to a first memory that stores first reflected pulses for the duration of the time of flight time window and the second receiver is connected to a second memory that stores second reflected pulses for the duration of the time of flight time window.

* * * * *